United States Patent Office

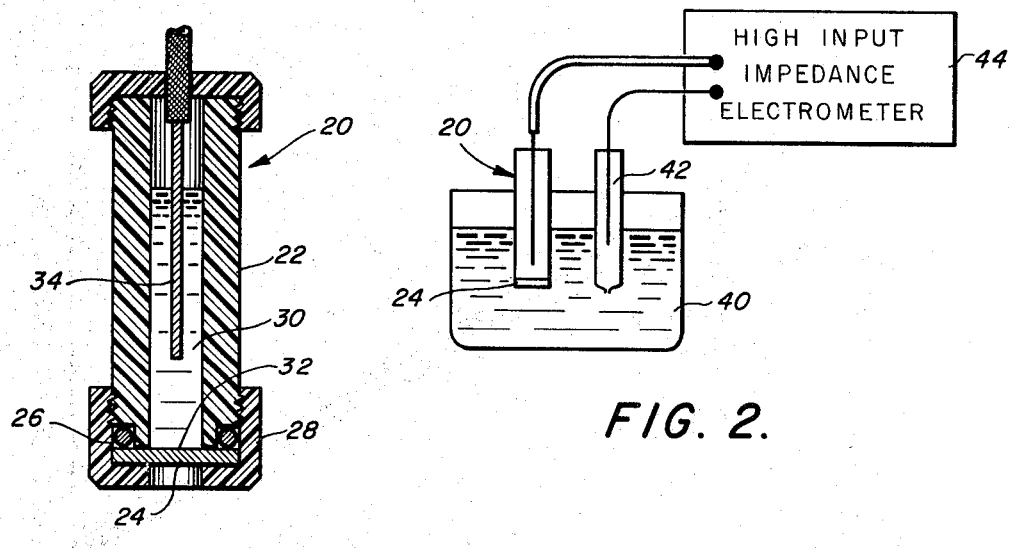
FIG. 1.
FIG. 2.
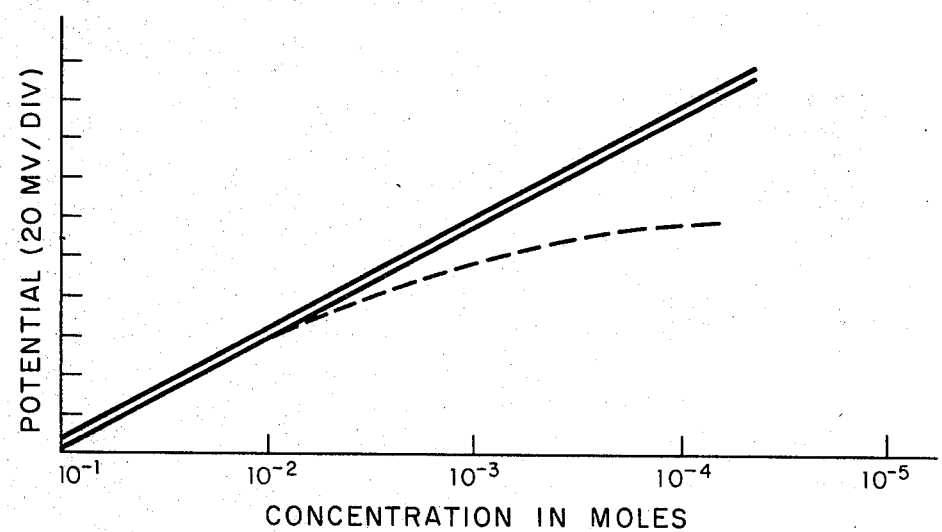
FIG. 3.
JAMES W. ROSS
JOHN H. RISEMAN
MARTIN S. FRANT
INVENTORS.
BY Robert J. Schiller
ATTORNEY.

3,563,874
Patented Feb. 16, 1971

3,563,874
HALIDE-SENSITIVE ELECTROCHEMICAL ELECTRODES AND METHOD OF MAKING SAME
James W. Ross and Martin S. Frant, Newton, and John H. Riseman, Cambridge, Mass., assignors to Orion Research Incorporated, Cambridge, Mass., a corporation of Massachusetts
Filed Oct. 2, 1967, Ser. No. 672,152
Int. Cl. G01n 27/54
U.S. Cl. 204—195                          16 Claims

ABSTRACT OF THE DISCLOSURE

An electrode sensitive to chloride ions in solution, the ion-sensitive portion being an imporous membrane of silver sulfide and silver chloride. The electrode is prepared by coprecipitating the silver salts, and after washing and drying, compressing the coprecipitate, under vacuum conditions, into a dense, imporous pellet. Bromide and iodide sensitive electrodes are prepared in substantially the same manner from silver sulfide and the corresponding silver halide.

---

This invention relates to electrochemical detection and measurement and more particularly to the detection and measurement of chloride ions in solutions.

Efforts have been made to develop electrochemical electrodes showing reversible Nernstian potentials with respect to chloride ions. Silver halide surfaces will yield this type of response either as the pure salt or the salt mixed with metallic silver. Silver halide electrodes per se, of course, are old in the art both as reference electrodes and chloride sensitive electrodes, as shown by British Pat. No. 872,486 issued July 21, 1961 to Beckman Instruments. As described in "Electric Potentials at Crystal Surfaces" by Kolthoff and Sanders, Journal of the American Chemistry Society, volume 59, pp. 416–420 (1937), electrodes of pure salt were shown to provide reasonably reproducible results. However, these membranes particularly of silver chloride, have poor mechanical properties in that they are readily scratched even by comparatively soft materials such as a fingernail. Hence, these membranes do not lend themselves readily to use in industrial process measurements where the solutions frequently contain abrasive materials and the electrode may require considerable handling. Additionally, electrodes employing prior art membranes, particularly of silver chloride, tend to be highly photosensitive and the electrode potential is seriously affected by the ambient illumination. Where the membrane is mixed with silver and silver salt, the presence of the free metal contributes electronic conductivity to the membranes and to the extent that such occurs, the electrode becomes highly susceptible to redox couples in a test solution, hence sharply limiting the test solutions with which the electrode can be used.

The present invention therefore contains as its principal object an improved method and means for electrochemical detection of the presence of chloride ions in solution. Other objects of the present invention are to provide improved electrodes employing membranes containing silver halide as the electrochemically sensitive element; to provide such electrodes in which the electrochemically sensitive element has superior mechanical properties; to provide such an electrode in which the electrochemically sensitive element has a considerably reduced photosensitive response; to provide a novel method of measuring halide ions in solution; and to provide a novel method for preparing halide-ion-sensitive electrodes.

Further objects of the present invention are to provide an electrochemical electrode sensitive to chloride ion in a stable and reproducible manner, which electrode contains as a chloride sensitive element thereof a mixed silver chloride, silver-sulfide body substantially free of metallic silver; and to provide an electrode sensitive to ions selected from the group consisting of chloride, bromide and iodide ions, which electrode comprises a membrane of a corresponding halide of silver mixed with silver sulfide to form a substantially imporous membrane, and means in contact with one side of the membrane at a substantially fixed reference potential.

Other objects of the invention will in part be obvious and will in part appear hereinafter. The invention accordingly comprises the apparatus possessing the construction, combination of elements, and arrangement of parts, and process including the several steps and the relation of one or more of such steps with respect to each of the others, all of which are exemplified in the following detailed disclosure and the scope of the application of which will be indicated in the claims.

For a fuller understanding of the nature and objects of the present invention, reference should be had to the following detailed description taken in connection with the accompanying drawings wherein:

FIG. 1 is a schematic, side-elevational, cross-sectional diagram of an electrode employing the principles of the present invention;

FIG. 2 is a schematic, side-elevational view, partly in cross-section, of a system employing the electrode of FIG. 1 for the detection of ions in solution; and FIG. 3 is a semi-logarithmic graph showing the response to chloride ion of several different electrodes each made according to the present invention.

The present invention generally involves the formation and use of electrochemical electrodes for potentiometric determination of ions such as chloride, bromide and iodide, which electrodes employ a substantially imporous, mechanically strong, substantially water-insoluble mixture of silver sulfide and a silver salt, AgX, where X is the ion of interest to be determined. The term "membrane" as used herein, consistent with its use in potentiometric electrode technology, is intended to include structures, generally regardless of size or curvature, which provide a pair of limiting surfaces across which ionic charge transfer is effected.

Referring now to the drawing there is shown in FIG. 1, electrode 20 embodying the principles of the present invention and comprising support and enclosure means securely in the form of an elongated, hollow tubular container 22. Such container typically is formed of a liquid-impervious, substantially rigid, electrically insulating material such as unplasticized polyvinyl chloride, polytetrafluorethylene epoxy resins or the like, substantially chemically inert to aqueous solutions containing chloride, bromide or iodide ions.

One end of container 22 is sealed with a barrier or membrane 24, such as a thin, imporous disk, formed of a mixture of silver sulfide and a silver halide selected from the group consisting of silver bromide, silver iodide and silver chloride. The thickness of the membrane is important only in respect to its mechanical strength and, of course, the electrical resistance across it. However, the membranes are quite strong, so they can be made quite thin, thereby economizing on material; typically the membrane thickness is in the nature of between 0.04 to 0.1 inch thick. Membrane 24 can be sealed to container 22 by suitable water-insoluble, electrically insulating adhesives such as epoxy resins or the like. Alternatively, the membrane, as shown, can be disposed across an end of container 22 on O-ring 26, and held compressed against the C-ring by collar 28 which is threadedly mounted on the container.

Means are provided for establishing an electrical connection at a fixed or reference contact potential to the surface of membrane 24 facing the interior of container 22. To this end electrode 20 includes a body of an electrolytic material such as reference electrolyte 30 disposed within container 22 and in contact with inner surface 32 of the membrane. Typically, reference electrolyte 30 is an aqueous 0.1 M solution of $AgNO_3$. As well known, it is important to insure that the potentials arising at the innerfaces between the membrane and electrolyte and between the reference electrode and electrolyte, all remain fixed. Thus, for the present invention it is necessary that the level of $Ag^+$ ions in electrolyte 30 remain fixed, the absolute value of that level not being particularly important. And to insure that the reference electrode-electrolyte potential remains stable, it is preferred that electrode 34 be formed of silver, or be an Ag—AgCl electrode, or be Pt or the like plated with silver. Immersed or in contact with electrolyte 30 is internal reference electrode 34, for example, the well known Ag—AgCl electrode or the like.

The other end of container 22 is fitted with apertured cap 36 through which extends the usual coaxial cable 38, the center conductor of which is connected to internal electrode 32 and the peripheral conductor of which provides desirable shielding by being typically grounded.

The most important consideration with respect to the electrode of FIG. 1 lies in the nature of membrane 24. The latter is an intimate mixture of silver sulfide and a silver halide. The proportions of silver sulfide and silver halide can vary quite widely and the method of formation of the membrane is quite important.

The membrane of the present invention is formed by compressing finely divided, intimately mixed, silver halide and silver sulfide under high enough pressure to compact the mixture into a substantially imporous mass. The mixture can be prepared by mechanically mixing finely cominuted salts. However, more satisfactory and uniform results are obtained by using a preferred method wherein, for example a chloride sensitive membrane is formed by preparing the mixed salts by coprecipitation of $Ag_2S$ and AgCl so as to obtain an extremely intimate, homogeneous mixture. This coprecipitate is obtained by adding appropriate quantities of solutions of $Na_2S$ and NaCl (or other readily water soluble chlorides such as KCl or the like) to one another, and the resulting solution to an aqueous solution containing a double excess of $AgNO_3$ so as to insure complete precipitation. The relative quantities of the $Na_2S$ and NaCl are varied according to the desired proportion of the two silver salts desired in the final membrane. The preferred mixtures permit variation between about 10 mol percent AgCl to about 90 mol percent AgCl. The resulting precipitate is thoroughly washed to remove substantially all traces of nitrates as by 20 or more exchanges of distilled water, and finally dried at 110° C. The dried precipitate is then packed into a die and compressed at room temperature for a few minutes, typically at ram pressures of 10 to 25 thousand p.s.i. applied to a die area of about 0.1 square inch. Preferably compression is carried out under vacuum conditions (ambient air pressure is preferably below 1 mm. Hg) which results in a denser, less porous membrane than those formed where the ambient air pressure is 760 mm. Hg. Care should be exercised to prevent the temperature of the compressing or compressed material from rising to or above the decomposition point of $Ag_2S$. The resulting product is a black-colored, mechanically strong, substantially imporous pellet quite resistant to scratching or abrasions. Typically, the die used is about 0.4 inch in diameter and provides sufficient depth so that the dried precipitate can be compressed to form a pellet of the desired thickness, e.g. 0.06 inch.

This membrane of $Ag_2S$ and AgCl is believed to be a true mixture rather than a compound, in that properties of the membrane, as the relative proportions of its components are varied, are proportionate interpolations of the properties of the two separate materials.

Pellets can be similarly prepared of silver sulfide and silver bromide, and of silver sulfide and silver iodide. The structures obtained after coprecipitating, washing, drying and compressing are similar in visual appearances to that of the chloride-sulfide membrane but are somewhat more complex, in that it is believed that these are not wholly mixtures of the two starting salts: after compression the pellets are believed to contain a substantial amount of the compound $Ag_3SX$ where X is iodide or bromide as the case may be. It has not been determined that an analogous compound forms on compressions of AgCl with $Ag_2S$, at least not under the conditions employed. In the case of the mixed iodide-sulfide and bromide-sulfide membranes, the minimum halide content should be above about 5 mol percent, otherwise the response of the membranes to halide ions will tend to be quite sluggish and drifty.

In all cases the membranes are substantially imporous, mechanically very strong, highly water-insoluble materials. The term "highly insoluble" used herein indicates that the membrane material has a solubility when in equilibrium with an aqueous solution in contact therewith, such that in that solution the concentration or activity of halide ions derived from the membrane is less than the lowest halide ion activity that one can reasonably expect or intends to measure in the solution.

As shown in FIG. 2 electrode 20 of the present invention, when in use is placed with the outer surface of membrane 24 in contact with test solution 40, e.g. a solution containing or which is thought to contain halide ions whose presence one seeks to detect. A standard reference electrode 42 is also placed in contact with solution 40. Both electrode 20 and electrode 42 are connected to respective inputs of high input impedance electrometer or voltmeter 44. Electrode 42 typically is the usual conventional calomel reference electrode with a controlled leak. In operation, a reference potential will develop between electrode 42 and solution 40 at some value fixed independently of the halide concentration in solution 40. A measurement potential will develop across membrane 24 between electrolyte 30 and solution 40, the measuring potential being a function of the activity of halide ion in solution 40. Because the internal contact potential between membrane 24, electrolyte 30 and reference electrode 34 is also fixed, the total potential measured by voltmeter 44 will vary only in accordance with the measurement potential developed across membrane 24, thus indicating the presence and extent of activity of halide ions in solution 40.

The membranes of the present invention typically exhibit lower resistivities than do comparable membranes of the silver halide alone. Very importantly, the membranes of the present invention will provide measurement potentials as above noted substantially without interference due to the presence of redox couples (such as ferrous-ferric or the like) in the test solution.

The qualities and characteristics of electrodes of the present invention can be seen by reference to the following examples.

EXAMPLE I

To show comparative qualities, a membrane was prepared of substantially pure silver chloride by precipitating AgCl from solution, washing, drying and compressing the precipitate as hereinbefore described. The resulting membrane a glossy clear pellet, was soft enough to scratch with a fingernail, and exhibited a volume resistivity of about $1 \times 10^7$ ohm. When incorporated into an electrode such as shown in FIG. 1 and described hereinbefore, and tested against a series of aqueous solutions of NaCl of different molarities, the response was Nernstian to an NaCl concentration in mols of about $1 \times 10^{-5}$, the curve lying between the limits shown in FIG. 3 as two solid line curves. The electrode, when in contact an 0.1 M NaCl solution, exhibited a change in potential when the conditions of ambient illumination were varied from dark to an arbitrary level of high illumination (typically ordinary room lighting), the change being not less than 30 mv. The results obtained here were then compared to the results achieved from the following.

EXAMPLE II

An electrode membrane was formed by coprecipitating AgCl and $Ag_2S$ from a solution of $AgNO_3$, and washing, drying and compressing as hereinbefore described. The proportion, in mol percent, of AgCl to $Ag_2S$ was 50/50. This membrane was a black, shiny pellet, quite hard and scratch resistant, dense and imporous. When incorporated into an electrode and tested against the series of aqueous NaCl solutions of Example I, the electrode exhibited the same Nernstian response lying between the limiting solid curves of FIG. 3. The membrane, however, showed a volume resistivity of about $1 \times 10^4$ ohm cm., and upon the same changes in ambient illumination from dark to light as in Example I, exhibited a changing potential of less than 1.5 mv.

EXAMPLE III

An electrode was prepared as in Example II with, however, the $AgCl/Ag_2S$ proportion in the membrane being 90/10 in mol percentages. The response to chloride ions was again Nernstian between the limiting curves of FIG. 3. However, the volume resistivity was about $7 \times 10^4$ ohm cm. The change in potential when subject to the illumination changes of Example I was about 3 mv. The pellet was harder and stronger than that of Example I but not as hard nor as strong as that of Example II.

EXAMPLE IV

An electrode was prepared as in Example II with, however, the $AgCl/Ag_2S$ mol percentages proportion in the membrane being 10/90. The photosensitive response was the same as in Example II (i.e. <1.5 mv.), the volume resistivity was about $1.5 \times 10^4$ ohm cm. and the membrane was as hard, dense and scratch resistant as that of Example II. However, the response was Nernstian only to concentration of NaCl of about $1 \times 10^{-3}$ molar, and below that, the response trailed off as shown in the broken line curve of FIG. 3.

EXAMPLE V

An electrode was prepared as in Example I, but with a pure $Ag_2S$ membrane. The photoelectric response of the latter was less than 1.5 mv. but the electrode showed no response whatsoever to variations in Cl⁻ concentrations in test solutions.

EXAMPLE VI

A number of electrodes were formed as in Example II but a series of starting mixtures of AgBr and $Ag_2S$ in which the mol percentage ratios of the latter varied from 5% AgBr/95% $Ag_2S$ to 95% AgBr/5% $Ag_2S$. The volume resistivities in all cases were less than those of a pure AgBr membrane formed similarly, the response to Br⁻ in solutions was Nernstian and the membranes were very hard, black and imporous. No significant variation in photoelectric response was observed probably due to the poor response of pure AgBr.

EXAMPLE VII

A number of electrodes were formed as in Example VI but of a series of starting mixtures of AgI and $Ag_2S$ varying in ratio of mol percentage from 5/95 to 95/5. Again, volume resistivities were uniformly lower than that of a pure AgI membrane which were so frangible that they tended to fragment even upon removal from the forming die. The photoelectric response was less than that of pure AgI but the improvement due to the addition of $Ag_2S$ was not as extensive as that formed in mixed $AgCl/Ag_2S$ membranes.

Since certain changes may be made in the above apparatus and processes without departing from the scope of the invention herein involved it is intended that all matter contained in the above description or shown in the accompanying drawing shall be interpreted in an illustrative and not in a limiting sense.

What is claimed is:

1. An electrochemical electrode sensitive to selected halide ions in solution and comprising:
   a substantially imporous membrane of a mixture of silver sulfide and a silver halide selected from the group consisting of silver iodide, silver bromide, and silver chloride, said membrane being substantially free of the thermal decomposition products of silver sulfide; and
   means for forming an electrical contact with one surface of said membrane at a substantially fixed potential.

2. An electrode as defined in claim 1 wherein said silver sulfide and silver halide are intimately mixed with one another as a compressed polycrystalline mass.

3. An electrode as defined in claim 1 wherein said silver halide is silver chloride and the proportion of silver sulfide to silver chloride lies within the range of 90/10 to 10/90.

4. An electrode as defined in claim 1 wherein said means for forming an electrical contact comprises an electrolyte in contact with said one surface of said membrane and a reference electrode in contact with said electrolyte, both being selected so as to provide a substantially fixed level of silver ion concentration in said electrolyte.

5. Method for producing an ion-sensitive membrane for an electrochemical electrode, comprising the steps of:
   intimately mixing finely divided silver sulfide and a silver halide selected from the group consisting of silver iodide, silver bromide and silver chloride; and
   compressing said mixture with sufficient force to render it a substantially imporous mass.

6. Method as defined in claim 5 wherein said step of intimately mixing comprises:
   coprecipitating said silver sulfide and silver halide in a common solution;
   washing the coprecipitate sufficiently to remove substantially all contaminants; and
   drying the washed coprecipitate at a temperature well below the decomposition level for silver sulfide.

7. Method as defined in claim 5 wherein said mixture is compressed under pressures above 10,000 p.s.i 8. Method as defined in claim 5 wherein said mixture is compressed in the presence of substantially vacuum conditions.

9. An electrochemical electrode sensitive to iodide ions in solution, and comprising:
   a substantially imporous membrane comprising a mixture of at least two compounds selected from the group consisting of silver sulfide, silver iodide and silver thioiodide, and being substantially free of the thermal decomposition products of silver sulfide; and
   means for forming an electrical contact with one surface of said membrane at a substantially fixed potential.

10. An electrode as defined in claim 9 wherein the proportion of silver sulfide to silver iodide in said mixture lies within the range of 95/5 to 5/95.

11. An electrochemical electrode sensitive to bromide ions in solution, and comprising:
   a substantially imporous membrane comprising a mixture of at least two compounds selected from the group consisting of silver sulfide, silver bromide and silver thiobromide, and being substantially free of the thermal decomposition products of silver sulfide; and
   means for forming an electrical contact with one surface of said membrane at a substantially fixed potential.

12. An electrode as defined in claim 11 wherein the proportion of silver sulfide to silver bromide in said mixture lies within the range of 95/5 to 5/95.

13. Method of producing an electrochemical electrode sensitive to halide ions in solution comprising the steps of:

intimately mixing finely divided silver sulfide and a silver halide selected from the group consisting of silver iodide, silver bromide and silver chloride;

compressing said mixture with sufficient force to render it a substantially imporous mass;

forming a membrane from said mass, and forming an electrical contact with one surface of said membrane at a substantially fixed potential.

14. Method as defined in claim 13 wherein said step of intimately mixing comprises:

coprecipitating said silver sulfide and silver halide in a common solution;

washing the coprecipitate sufficiently to remove substantially all contaminants; and drying the washed coprecipitate at a temperature well below the thermal decomposition level for silver sulfide.

15. Method as defined in claim 13 wherein said mixture is compressed under pressures above 10,000 p.s.i.

16. Method as defined in claim 13 wherein said mixture is compressed in the presence of substantially vacuum conditions.

References Cited

Skobets et al., "Jour. of General Chemistry," vol. X, Issue 17, 1940, pp. 1612–1620.

Mellor, "Comprehensive Treatise on Inorganic & Theoretical Chemistry," vol. 3, 1941, p. 442.

TA-HSUNG TUNG, Primary Examiner

U.S. Cl. X.R.

204—1; 23—87, 134